United States Patent [19]

Holcomb

[11] Patent Number: 4,537,123
[45] Date of Patent: Aug. 27, 1985

[54] DEVICE FOR PRESSING GARLIC AND THE LIKE

[75] Inventor: David A. Holcomb, Seattle, Wash.

[73] Assignee: F & H Holdings, Inc., Bellevue, Wash.

[21] Appl. No.: 424,838

[22] Filed: Sep. 27, 1982

[51] Int. Cl.³ ............................................. B30B 1/20
[52] U.S. Cl. .................................. 100/125; 100/289; 99/510
[58] Field of Search ....................... 100/125, 130, 289; D7/52, 53; 99/510

[56] References Cited

U.S. PATENT DOCUMENTS

| | | | |
|---|---|---|---|
| 306,166 | 10/1884 | Matthews | 100/289 X |
| 1,223,642 | 4/1917 | Taylor | 100/289 X |
| 2,818,797 | 1/1958 | Ballor | 100/289 X |
| 3,483,810 | 12/1969 | Peters et al. | D7/106 X |
| 3,587,692 | 6/1971 | Nelson | D7/106 X |
| 4,348,950 | 9/1982 | Harris | 99/510 |

*Primary Examiner*—Billy J. Wilhite
*Assistant Examiner*—Christine A. Peterson
*Attorney, Agent, or Firm*—Cole, Jensen & Puntigam

[57] ABSTRACT

Garlic press which includes a plastic transparent cylindrical body one end of which is closed and through which is threaded an elongated rod. The rod on the outside has a turning handle and on the inside detachably connects to a piston. An end piece threads on to the open end of the cylindrical body and contains a number of perforations through which the garlic is extruded. Garlic may be stored in the cylinder and the end piece covered with a closure member for preventing escape of odors when the press is not in use.

4 Claims, 8 Drawing Figures

FIG. 4
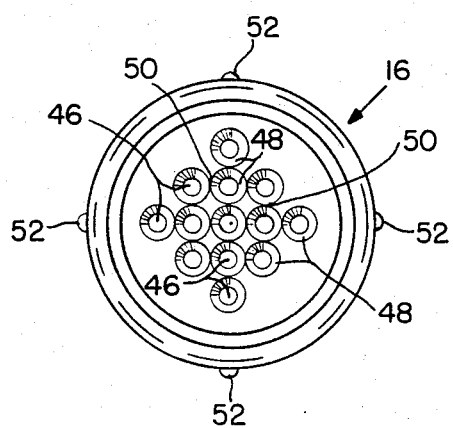
FIG. 5
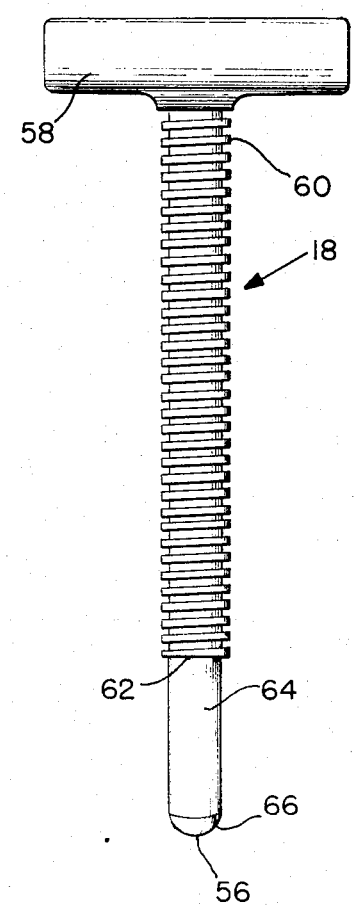
FIG. 8
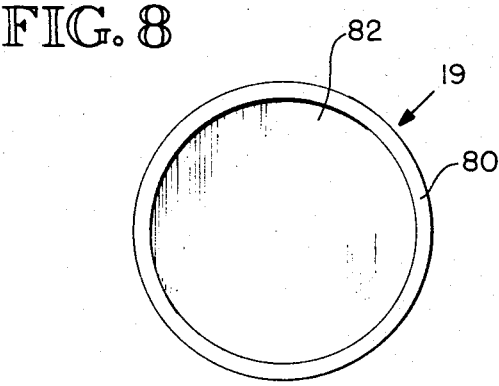
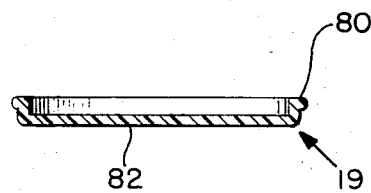
FIG. 7
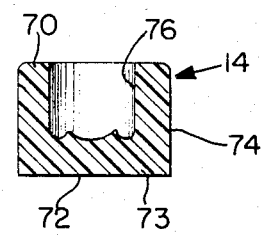
FIG. 6

DEVICE FOR PRESSING GARLIC AND THE LIKE

BACKGROUND OF THE INVENTION

The invention relates generally to the field of food extruders and more particularly to a device for pressing garlic cloves into smaller and more usable sizes.

Those who are skilled in cooking are aware that garlic presses have taken many shapes but that they generally are single use devices after which use it is necessary to disassemble and clean them. Thus, for people who frequently cook with garlic, the tedious process of cleaning the garlic press after each use is a time consuming and irritating task.

Prior art references relating to the invention are U.S. Pat. Nos. 769,015; 1,129,254; 1,661,802; and 2,826,138. While three of the above references show a screw actuated piston for extruding food, none of the references shows the structure and operating principles disclosed and claimed in the instant invention.

SUMMARY OF THE INVENTION

The invention herein comprises a transparent plastic elongated cylindrical body one end of which is closed and the other end of which is open. The closed end has a threaded opening through which extends an elongated threaded rod or stem. The outer end of the rod has a turning handle and the inner end has a rounded blunt nose for contacting a cup-shaped piston. The piston slides freely within the body and is moved outwardly by the threaded rod. The open end of the body has external threads to receive a shallow cylindrical or cup-shaped end piece which is internally threaded. The end piece has a plurality of openings or perforations through which the garlic is squeezed or extruded. A closure cap fits over the end piece so that when the device is not in use, odors cannot escape.

Accordingly, it is among the many features and advantages of the invention to make the task of pressing garlic more convenient. This is accomplished by the fact that the device has storage capacity as well as by the mode of operation and structural features of the invention. The storage cylinder or body can hold garlic cloves for both immediate and future use. The body is made of a transparent or clear polycarbonate material allowing the user to conveniently observe the amount of garlic available for use within the body. All parts are made of plastic and the device can be completely disassembled for thorough cleaning.

BRIEF DESCRIPTION OF THE DRAWINGS

FIG. 4 is a top plan view of the inside of the end piece of FIG. 3;

FIG. 5 is a side elevation view of the threaded rod member;

FIG. 6 is a cross-sectional view of the piston which is slidably received within the body;

FIG. 7 is a cross-sectional view of a closure cap for the perforated end piece; and FIG. 8 is a top plan view of the inside of the closure cap of FIG. 7.

DESCRIPTION OF PREFERRED EMBODIMENT

Figure 1:
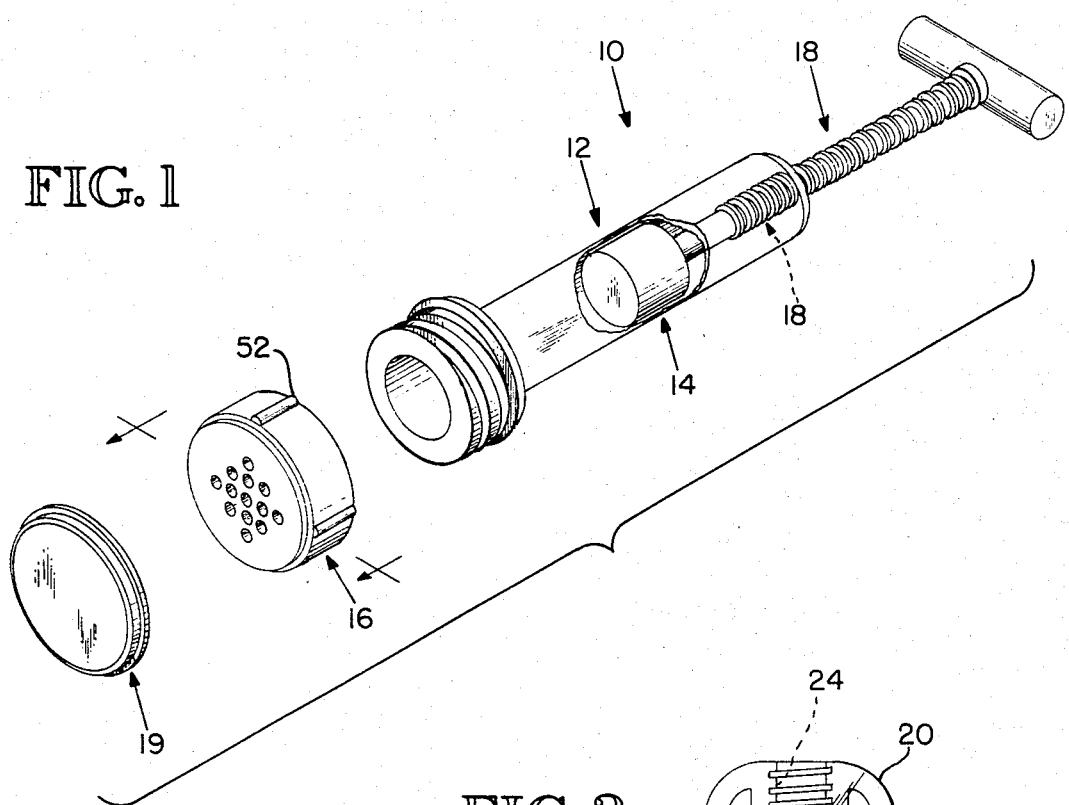
FIG. 1 is a perspective view of the device with the end piece and closure cap removed.
Figure 2:
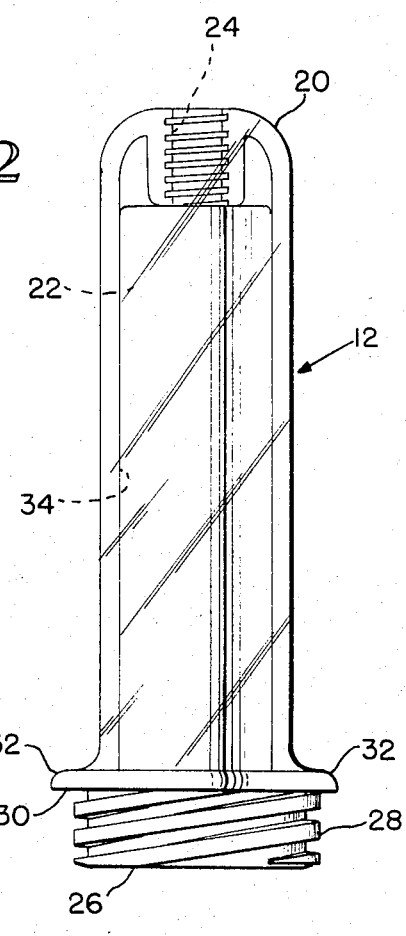
FIG. 2 is a side elevation view showing the main body of the invention.

With reference to the drawings, and particularly FIG. 1, it will be seen that the device of this invention includes an elongated clear or transparent storage cylinder generally designated by the FIG. 12. The storage cylinder or body 12 has a closed end 20, the inside of which is provided with an axially extending thread support section 22 through which extend internal threads 24 for receiving the elongated stem or rod 18. Body 12 has an open end 26 the outside of which is threaded as by heavy square or coarse threads 28 for a distance of perhaps ½ inch on the outside. The threads extend to a radially offset, flat, annular surface 30 which is transverse to the axis of the cylindrical body. The wall of the cylindrical body extends outwardly in the form of surface 32 which together with surface 30 defines a rim against which the end piece abuts when it is threaded on the body.

It will be noted that the clear plastic polycarbonate body has a wall thickness sufficient to impart rigidity and strength and as such, it has a continuous even interior wall surface 34 which extends from the thread support section 22 to open end 26 of the body.

Figure 3:
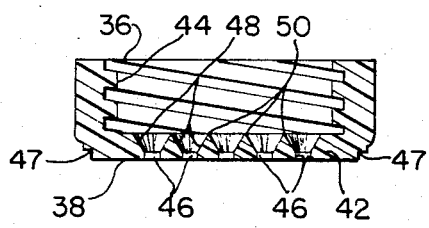
FIG. 3 is a cross-section view of the end piece which threads onto the open end of the body of FIG. 2.

FIG. 3 shows the perforated end piece generally designated by the number 14. The perforated end piece is a shallow, bowl-shaped cylindrical unit having a top surface or edge 36 and an outer or bottom surface 38. The end piece is provided with continuous side wall 40 and bottom wall 42. On the inside of side wall 40 are coacting threads 44 which engage threads 28 of the body. Holes or perforations 46 are formed in a predetermined pattern in the bottom wall 42. It will be noted that the holes or openings 46 are spaced in such a way that a 60° counter sunk slope 48 for each opening 46 defines a sharp edge 50 between openings to facilitate squeezing the garlic cloves through the perforations. As is seen in FIG. 4, four equally spaced external ridges 52 are located on the outside of side wall 40 and they extend generally parallel to the axis to facilitate gripping and twisting the end piece on and off the body. End piece 14 is preferably made of an opaque plastic material.

FIG. 5 shows the threaded stem or rod generally designated by the number 18 which has an inner end 56 and a handle end 58. The stem assembly 18 is provided with threads 60 which coact with threads 24 in the thread support assembly 22 in the closed end of the body 12. The threads extend from the handle 58 over the length of the rod or stem to a point 62 at a predetermined distance from the inner end 56. A nose portion 64 extends from the threads or point 62 to a rounded surface 66.

FIG. 6 shows the plunger or piston 14 which is also in the form of a thick walled cylindrical bowl and has upper edge surface 70, garlic engaging surface or piston head 72, side wall surface 74 and inside wall surface 76. The inside or interior surface of bottom wall 73 is provided with an upwardly facing rounded coacting surface 78 which receives end 56 and rounded surface 66 of the rod. Piston 14 slides freely within the body of the device. It will be appreciated that the device is easy to clean since the perforated end piece 16 can be removed, the threaded rod or stem 18 can be threaded out of the body and the plunger or piston pushed out so that all parts can be thoroughly and very easily cleaned. For ease of disassembling no detachable connection is made between rod 18 and piston 14 though it should be recognized that if desired such a connection may be made.

When a supply of garlic is placed within the cylindrical body and the supply is only partially used, that instead of disassembling the device as would normally be the case, a closure cap 19 is provided in the form of a shallow cylindrical means with side walls 80 and cap wall 82. The inner edges of side walls 80 engage the offset surface 47 on the outside of end piece 14 to seal the inside and preventing escape of odors when the device is not in use.

What is claimed is:

1. Device for extruding garlic cloves and the like, comprising:
    (a) an integrally formed elongated cylindrically tubular transparent plastic body having a cylinder wall and also having a closed end and an open end, said closed end having an inwardly extending central stem support portion of predetermined greater thickness than said cylinder wall and including generally axially disposed internal threads for receiving a threaded stem member, the open end of said body having external threads for receiving a threaded end piece, said body defining therein a storage cavity,
    (b) a shallow, cylindrical, cup-shaped plastic end piece having an integral side wall and bottom wall and also having internal threads on said side wall for threadably engaging the external threads on the open end of said body, and further including a plurality of openings in said bottom wall, said end piece having an annular, radially inwardly offset closure cap engaging surface around the outside of said bottom wall,
    (c) a cylindrically shaped plastic piston member slidable within said body and shaped to present a generally flat round surface facing toward the open end of said body and designed to be engaged by a piston stem,
    (d) an elongated plastic threaded stem member for being receiving at said closed end of said body through said internal threads and having an inner end which coactingly engages said piston member within said body and which extends out of said closed end and has an outer end to which is attached a handle means for threading said stem member in and out as required, and
    (e) a plastic closure cap means for engaging said closure cap engaging surface on said end piece for enclosing the interior of said device and preventing the escape of odors from food contained within said storage cavity.

2. The device according to claim 1 and in which said body is provided with an annular flange and radially offset surface against which the side wall of said end piece abuts said flange and offset surface defining an annular rim integrally formed on said body.

3. The device according to claim 2, and in which the internal side of said plurality of openings in said end piece are countersunk to a predetermined depth to define angled planar surfaces facing into the interior of said body and which countersunk openings of adjacent holes define a sharp edge therebetween to facilitate pressing of said garlic cloves and the like through said openings.

4. The device according to claim 3 and in which engagement between said stem member and said piston member is a contact engagement for pushing said piston member into contact with garlic cloves within said storage cavity for pressing and extruding garlic through said openings, said engagement further being such that upon threading of said stem member outwardly said stem member inner end disengages from said piston member.

* * * * *